United States Patent [19]

Carman et al.

[11] Patent Number: 5,658,020

[45] Date of Patent: *Aug. 19, 1997

[54] QUICK CONNECTOR

[75] Inventors: Anthony K. Carman, Waterford; Duane J. Pontbriand, Metamora; Gary Klinger, Warren, all of Mich.

[73] Assignee: ITT Corporation, New York, N.Y.

[*] Notice: The term of this patent shall not extend beyond the expiration date of Pat. No. 5,354,102.

[21] Appl. No.: 474,032

[22] Filed: Jun. 7, 1995

Related U.S. Application Data

[63] Continuation-in-part of Ser. No. 332,673, Nov. 1, 1994, Pat. No. 5,468,024, which is a continuation-in-part of Ser. No. 35,823, Mar. 23, 1993, Pat. No. 5,360,237.

[51] Int. Cl.$^6$ .................................................. F16L 35/00
[52] U.S. Cl. ........................... 285/81; 285/319; 285/921; 24/545; 24/555; 24/573.1; 24/16 R
[58] Field of Search ............................... 285/319, 921, 285/81, 82, 144, 305; 24/16 R, 545, 547, 573.1, 543, 555

[56] References Cited

U.S. PATENT DOCUMENTS

| | | | |
|---|---|---|---|
| 1,436,882 | 11/1922 | Knepper . | |
| 2,413,730 | 1/1947 | Samiran | 285/82 X |
| 3,469,864 | 9/1969 | Guerrero | 285/308 |
| 3,801,954 | 4/1974 | Dorrell | 285/82 X |
| 3,858,915 | 1/1975 | De Vincent et al. | 285/81 |
| 3,945,669 | 3/1976 | Bochory | 285/82 |
| 4,244,608 | 1/1981 | Stuemky | 24/573.1 |
| 4,874,174 | 10/1989 | Kojima et al. | 285/82 |
| 5,046,765 | 9/1991 | Usui | 285/305 |
| 5,069,424 | 12/1991 | Dennany et al. . | |
| 5,112,085 | 5/1992 | Busch et al. | 285/39 |
| 5,152,555 | 10/1992 | Szabo | 285/319 X |
| 5,195,787 | 3/1993 | Bartholomew | 285/921 X |
| 5,350,201 | 9/1994 | Bynum | 285/921 |
| 5,354,102 | 10/1994 | Carman | 285/81 |

FOREIGN PATENT DOCUMENTS

| | | | |
|---|---|---|---|
| 2291438 | 6/1976 | France | 285/924 |
| 2949 | 2/1992 | United Kingdom | 285/81 |
| 90/15281 | 12/1990 | WIPO . | |

*Primary Examiner*—Terry Lee Melius
*Assistant Examiner*—Heather Shackelford
*Attorney, Agent, or Firm*—J. Gordon Lewis; Thomas N. Twomey

[57] ABSTRACT

A quick connector for fast connection of fluid carrying assemblies such as a mating tube and a fluid unit includes a connector body that houses the connector components and accepts a redundant clip, which is adapted to engage an upset bead of the male tube. The redundant clip is generally L-shaped and includes a retaining head that is inserted into the connector body and is adapted to engage the upset bead. A body portion, which extends along the side of the connector body and in the preferred embodiment is contoured to mate with the connector body, extends between the retaining head and a base member. The base includes a camming edge for facilitating the insertion of the retainer head into the connector body.

16 Claims, 6 Drawing Sheets

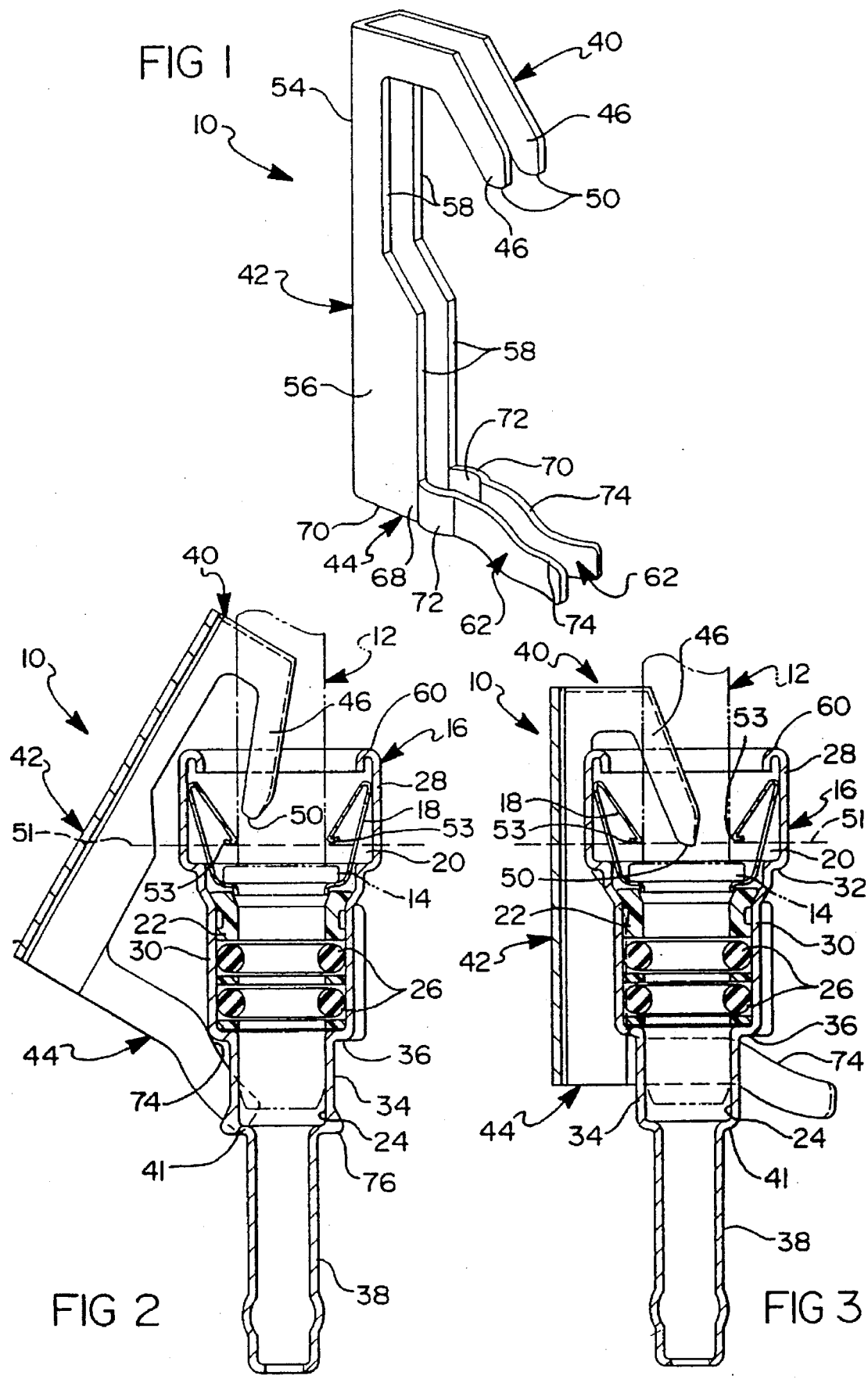

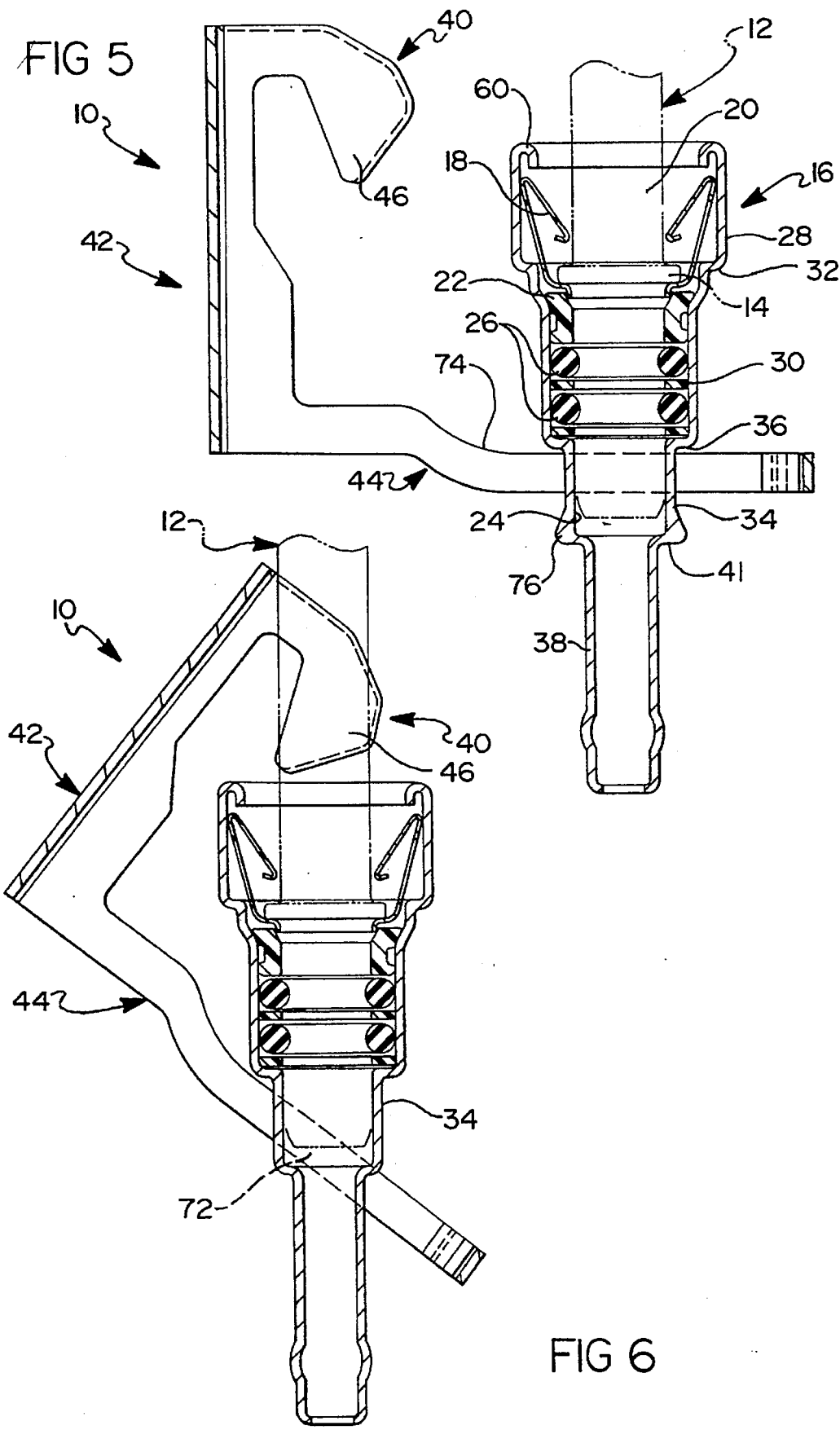

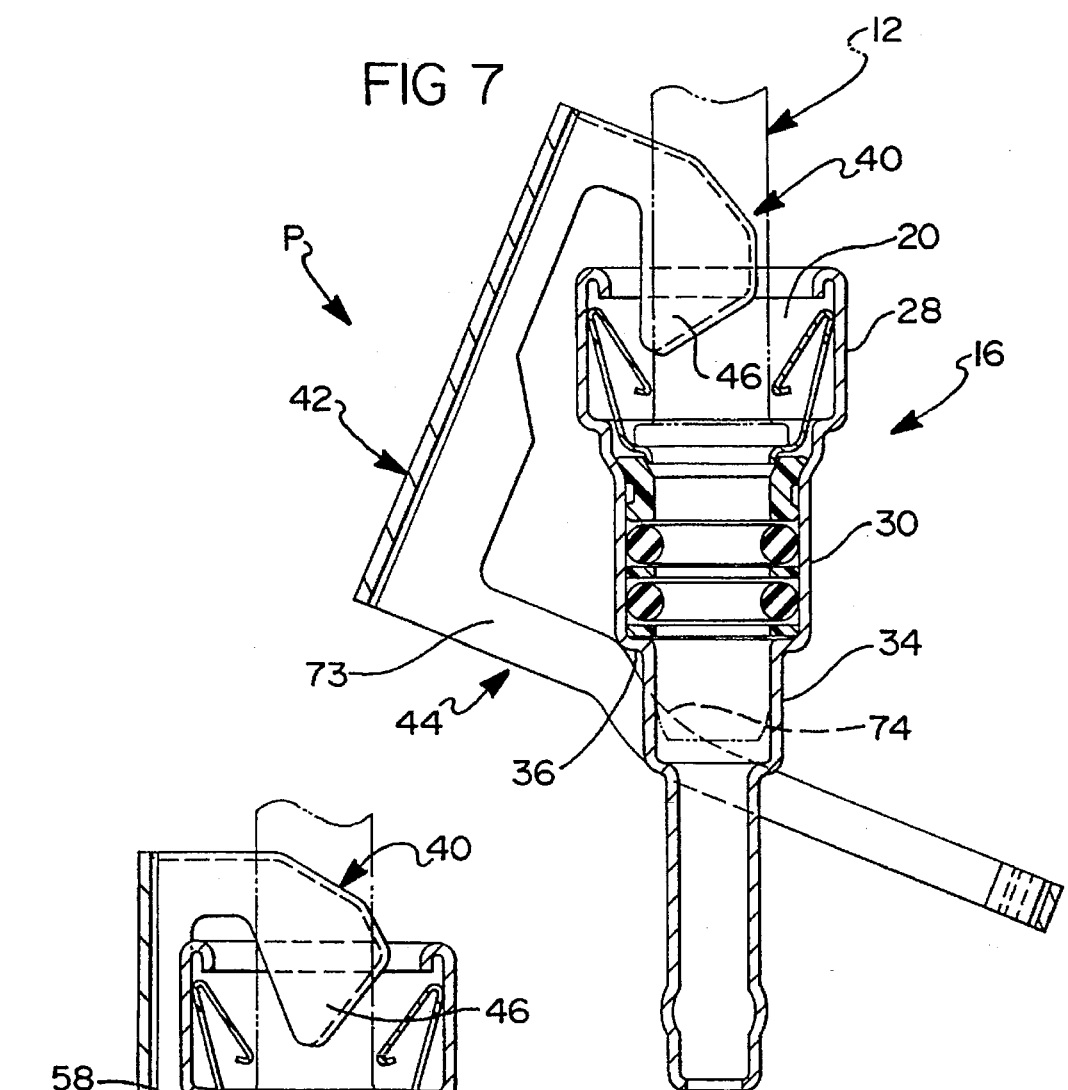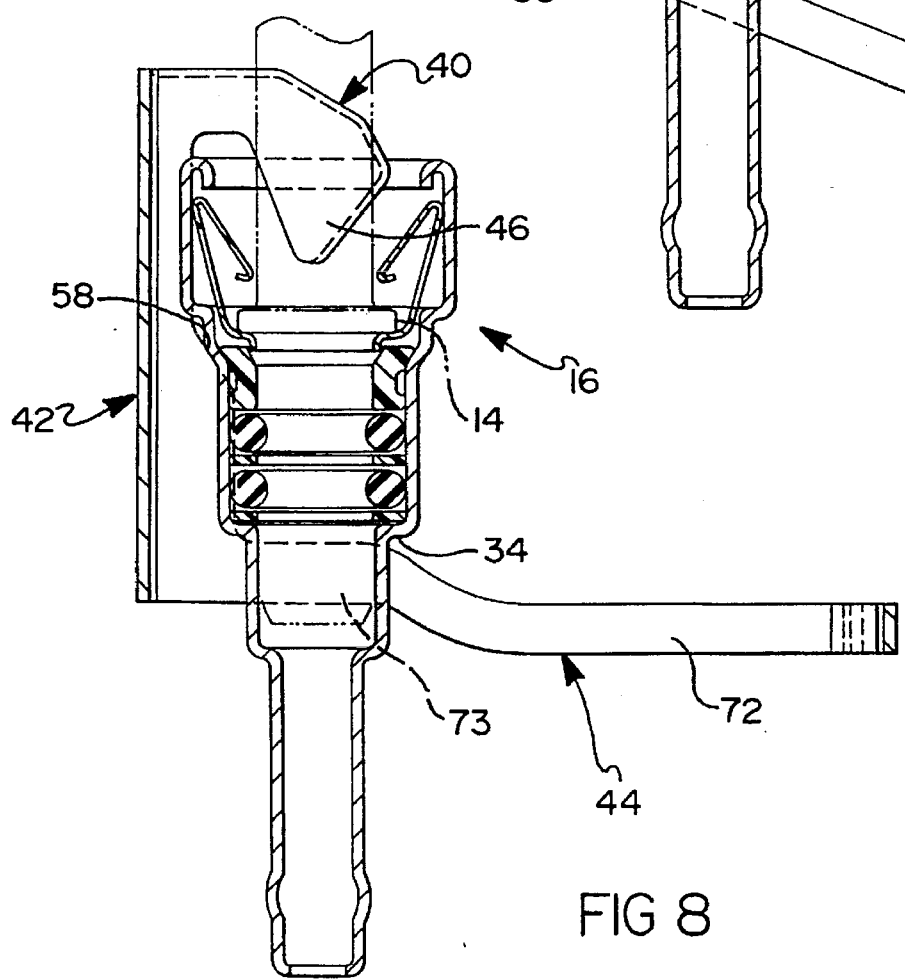

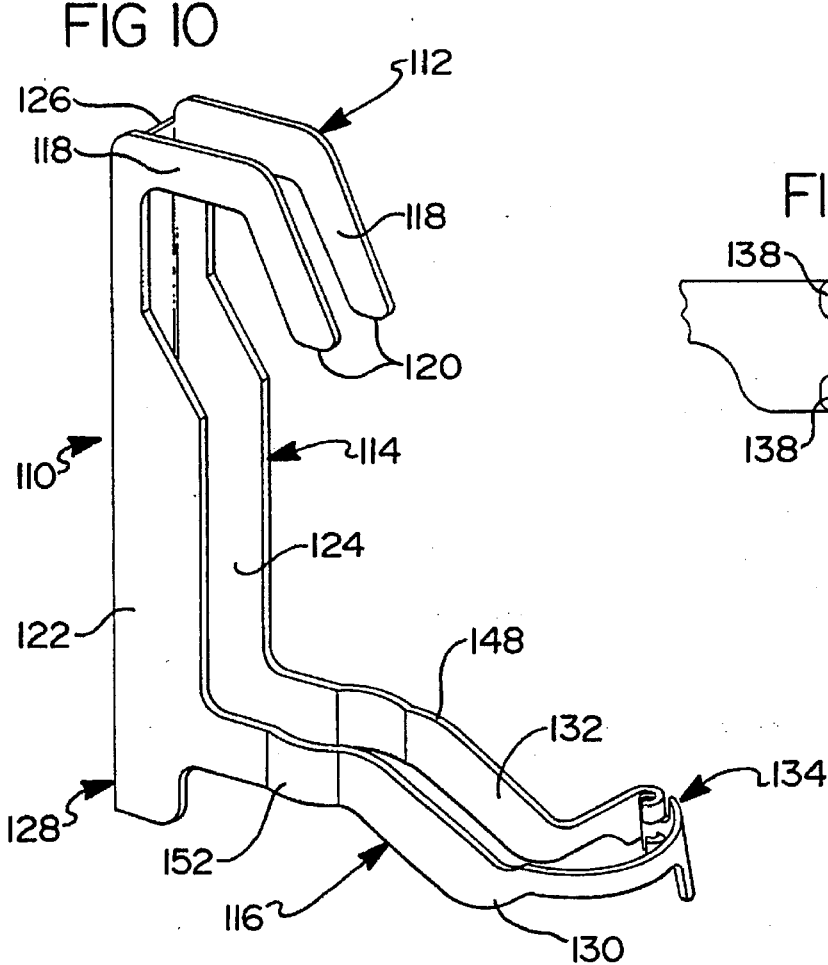
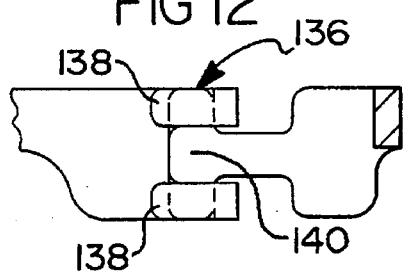
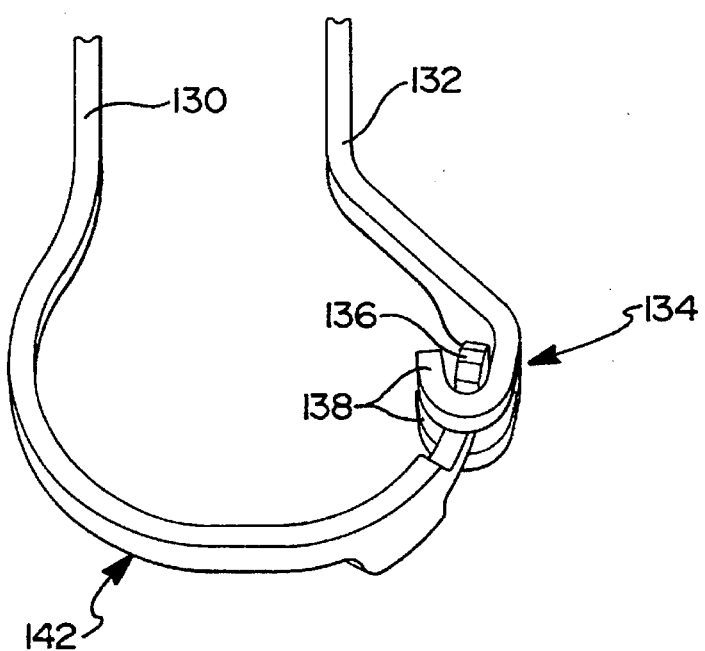

QUICK CONNECTOR

BACKGROUND OF THE INVENTION

This application is a continuation-in-part of the application Ser. No. 332,673, filed Nov. 1, 1994, now U.S. Pat. No. 5,468,024 which is a continuation-in-part of application Ser. No. 035,823, filed Mar. 23, 1993, now U.S. Pat. No. 5,360,237, issued Nov. 1, 1994.

This invention generally relates to quick connectors and more particularly to a redundant clip for quick connectors. More particularly, the present invention is an improvement over the Quick Connector disclosed in U.S. patent application Ser. No. 08/012,715 filed Feb. 3, 1993, and assigned to the assignee of the present application.

Quick connectors are known and have been widely used in the art and are used in fluid carrying assemblies such as automobile assembly plants and service centers. More recently, these connectors have been provided in the form of a unitary connector body which is joined with the male end of a mating tube. The recent connectors use an internal connector component which receives an upset bead on the male tube member to retain the male tube member within the unitary connector. These recent connectors utilize either a pair of O-rings or a one-piece seal with multiple ribs to seal the male member with respect to the unitary connector. The O-rings or ribs surround the center male end of the mating tube. These connectors have the disadvantage that if an accidental disconnection occurs, fluid can flow out of the connector body. These connectors have the further disadvantage that an indication as to whether a proper lock connection has been provided is not readily apparent.

U.S. Pat. No. 5,069,424 issued to Robert Dennany and Ken Randall and assigned to the assignee of the present invention, ITT Corporation, addresses the above problems that occur with single clips. The '424 patent discloses a secondary retaining clip which had means for engaging a portion of the housing to releasably lock the secondary retaining clip to the housing. This retaining clip has resilient finger portions which are received within annular grooves in the unitary connector housing. The retaining clip has an inwardly directed portion which will engage the bead of the male tube if it is attempted to be removed. The secondary clip can only be connected if the male tube is properly received within the unitary connector.

One disadvantage of the '424 connector is that it requires an annular groove to be formed in the housing. Further, the secondary clip would likely require one or more tools in order to remove the resilient fingers from the annular groove formed in the housing.

SUMMARY OF THE INVENTION

The present invention overcomes the above problems with known quick connects and redundant quick connects and provides other advantages as well.

The presently most preferred embodiment of this invention provides a locking clip for use in retaining a male member within a female connector. The clip has a retaining head for engaging a portion of the male member when the male member is in the female connector. A base portion is included on the clip, which is distal from the retaining head, and has spaced members that are received about an outer diameter of the female connector. The spaced body portion members have a cam surface that cams against the female connector to facilitate placing the clip into a locking position for retaining the male member within the female connector.

In the preferred embodiment, the spaced base portion members comprise leg members that have a top edge that defines the cam surface for engaging the female connector at the engaging ledge to facilitate movement of the clip to the clipped position. Further, the leg members have opposed detents to receive the reduced section when the clip is in the clipped position. The most preferred embodiment includes a T-shaped configuration at an end of one of the legs and cooperating fingers at the end of the other leg. The T and the fingers are interlocked so the clip is maintained about the female connector housing, even in an unlocked position.

As is typical, the female member has an exterior surface that is contoured to define at least a first section, a reduced diameter second section and a third section that has an outer diameter greater than the second section. The first and second sections have the engaging surface therebetween.

Although the preferred embodiment relies upon the cam surface to facilitate clipping the clip on the female member, in another embodiment, the legs are sufficiently flexible to flex about the second or third sections and ultimately snap about the second section when the clip is clipped in place. This simplifies installation and removal of the clip.

As should be appreciated, the clip can be locked and unlocked without the need for tools. The clip is an exterior clip which is highly reliable and gives a clear indication when the clip is properly fastened. The clip is only properly fastened when the body member of the clip is adjacent and parallel to the body housing. In the preferred embodiment, the mating contour of the inside edge of the body member of the clip with the exterior surface of the housing make a sure indication of proper alignment. It also provides the advantage of a redundant or a secondary clip to ensure against improper installation of the primary clip. A still further advantage is that the clip does not require modification of a standard connector housing, the clip is merely snapped over a reduced portion of the standard housing. The clip is also less expensive to manufacture, easier to clip onto a housing and able to be used in tight spaces. A still further advantage is that the legs of the base are more resilient and can be used on various sizes of connectors. Overall, it is a much more versatile clip than previously available.

An alternative embodiment of the present invention provides an improved secondary or redundant clip for connecting a male tube to a unitary connector or connector housing. In the disclosed embodiment the male tube includes an upset portion and the connector housing has a recess for receiving the male tube and the upset. The connector housing has an exterior surface that is contoured to define at least a first section and second section, with the second section having reduced diameter. As further disclosed in the preferred embodiment, the connector housing includes a primary connector assembly for primarily retaining the tube in the housing.

The alternative embodiment of the clip of the present invention is generally L-shaped and includes a retaining head, a body portion and a base portion. The retaining head is adapted to engage the upset of the male tube when the male tube is positioned within the recess of the connector housing. The retaining head is defined by a pair of spaced fingers ending in engaging ears. The engaging ears extend inwardly with respect to each other to form a reduced space between the fingers. The reduced space has a width which is less that the diameter of the male tube so that the ears have to be biased outwardly to receive the male tube.

The retaining head extends outwardly from the body portion at an angle with respect to the body portion and is spaced from the body portion by a distance slightly greater that the distance between the exterior surface of the connector housing and the recess.

The body portion is defined by a channel having a base and sidewalls. The sidewalls extend generally perpendicular to the base. In the preferred embodiment, the sidewalls have an edge that is contoured to generally mate with the exterior contour of the connector housing.

The base portion is defined by spaced leg members which extend outwardly from the body portion and are preferably joined at their ends. The leg members are spaced apart a distance which is slightly less than the outer diameter of the reduced section of the connector housing so that they bias against the reduced section. In the preferred embodiment, the leg members have first and second spaced detents to receive the reduced section. These detents correspond to the latched and unlatched positions of the clip. Each of the leg members includes a top edge that defines a cam surface for engaging the bottom of the reduced surface to facilitate the insertion of the retaining head into the recess of the connector housing and for locking the clip in place. The cam and leg members act as a lever giving substantial mechanical advantage to insertion of the head portion. The cam surface ends in a locking surface which is adjacent the body portion and is adapted to engage the bottom of the reduced surface when the clip is in the latched position. This engagement provides the needed retention force to retain the tube in the connector.

In use, the clip is mounted to the connector housing by the base member. It is intended that the clip always remain attached to the connector housing and in particular to the reduced section. In the disclosed embodiment, the clip is mounted onto the reduced section by separating the legs and placing the reduced section between them and then snapping the free ends of the legs together. The legs are biased against the reduced section of the connector busing and can slide with respect to the housing.

To use the clip, the first step in locking the male tube with respect to the connector housing is to rotate the clip against the male tube. With slight pressure against the base of the body member, just behind the retaining head, the engaging ears can be forced apart and about tube. Rotation of the clip is facilitated by the interaction of the detent with respect to the reduced section which, in combination, acts as a pivot point. The edge of the base member abuts the base of the second section when the ears are clipped about the tube.

By next applying pressure to the base of the body portion of the clip just behind the base member, the legs slide along the reduced section and the cam surface is caused to cam against the base of the reduced section. It should be appreciated that the ears are biased against the tube and form a second pivot point with respect to the tube. As pressure is applied to the body portion, the ears simultaneously pivot and slide with respect to the tube in the direction of the connector housing as the cam surface is cammed against the base of the reduced section.

After rotation of the clip, the second detent on the legs of the clip engages the reduced section and the retaining head is securely inserted into the connector housing to retain the tube therein. The top edge of the legs abuts the base in this position. In this way, the retention force of the clip or the pull-out strength is determined by the shear strength of the body member at the joinder of the head and base member.

To disconnect the tube from the connector housing, the base member is slid away from the connector housing. The edge and cam abut the base and the retaining head is slid out of the connector housing. A surface on the engaging ears can be pushed by the user to spread open the fingers to release the retaining head from the tube. The clip is then in the unlocked position.

As should be appreciated, the clip can be locked and unlocked without the need for tools. Additionally, the clip remains on the housing so that it is not misplaced and so that it is much easier to ship with the housing. The clip is an exterior clip which is highly reliable and gives a clear indication when the clip is properly fastened. The clip is only properly fastened when the body member of the clip is adjacent and parallel to the body housing, in the preferred embodiment, the mating contour of the inside edge of the body member of the clip with the exterior surface of the housing make a sure indication of proper alignment. It also provides the advantage of a redundant or a secondary clip to ensure against improper installation of the primary clip. A still further advantage is that the clip does not require modification of a standard connector housing, the clip is merely snapped over a reduced portion of the standard housing.

The most preferred embodiment described above is most preferred because it overcomes some disadvantages associated with the alternative embodiment. The alternative embodiment is intended to be tethered to the female connector which requires that the base be fairly long to accommodate closing means. This requires more material and increases costs. Additionally, when connected, the alternative embodiment extends beyond the female clip a considerable distance making the clip difficult to use in tight locations. Further, due to the clip being tethered, the head is shorter to facilitate assembly. This shorter head is not long enough to form a double lock on the upset of the male member at the line of engagement which is defined by the locking fingers of the primary retainer. For the redundant clip to act against the upset, the upset must be outside the locking fingers of the primary retainer. Such a condition only exists when the male member has not been properly inserted or the primary retainer has failed. Still further, the clip requires several steps for assembly.

BRIEF DESCRIPTION OF THE DRAWINGS

FIG. 1 is a perspective view of one embodiment of the clip of the present invention.

FIG. 2 is a side view of the FIG. 1 embodiment in the unlocked position.

FIG. 3 is a side view of the FIG. 1 embodiment in the locked position.

FIG. 5 is a side view of the FIG. 4 embodiment in the unlocked position.

FIG. 6 is a side view of the FIG. 4 embodiment as it is rotated to or from the locked position.

FIG. 7 is a side view of the FIG. 4 embodiment in the camming position.

FIG. 8 is a side view of the FIG. 4 embodiment in the locked position.

FIG. 10 is a perspective view of the presently preferred embodiment of this invention.

FIG. 11 is a perspective view of a portion of the embodiment of FIG. 10.

FIG. 12 is a planar view showing details of the feature illustrated in FIG. 11.

DETAILED DESCRIPTION OF THE PREFERRED EMBODIMENTS

Figure 4:
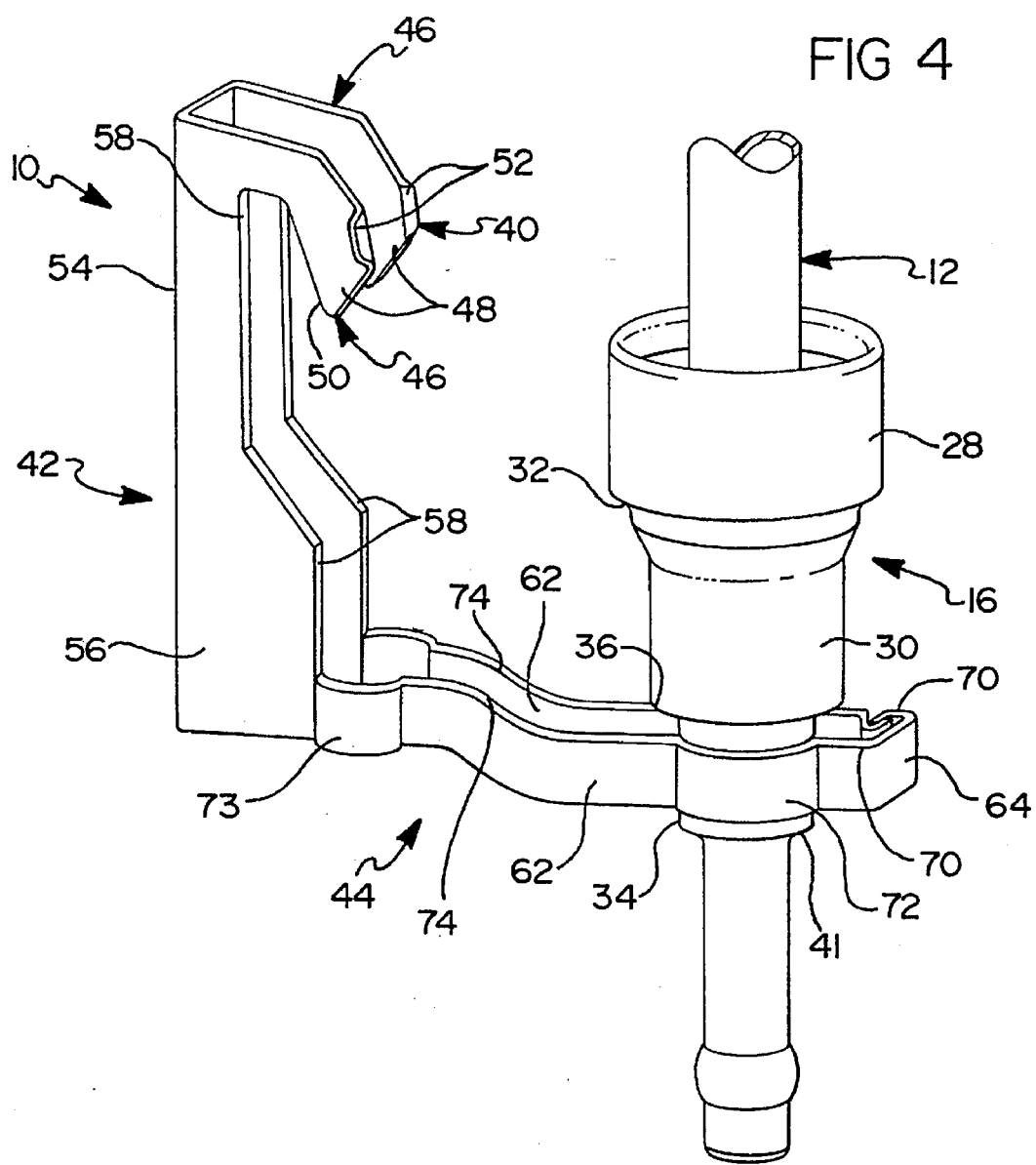
FIG. 4 is a perspective view of another embodiment of the present invention attached to a tube connector.

With reference to FIG. 1, the redundant clip of the present invention is shown generally at 10. In the preferred embodiment, the clip is made from 301 stainless steel, ¾ hard with a thickness of 0.032 to 0.036 inches. The clip is used to retain a tube 12 within a connector housing 16. As should be appreciated, the tube 12 and the connector housing 16 are standard quick connects. With reference to FIGS. 2 and 3, the tube 12 includes an upset 14 and in the disclosed embodiment the connector housing 16 includes locking fingers 18 mounted in the interior 20 of the housing. The fingers 18 are adapted to retain the tube 12 within the female housing 16. The connector housing includes a top hat 22 and a bearing surface 24 for maintaining the alignment of the tube 12 within connector housing 16. O-rings 26 are provided to seal the male tube 12 with respect to the connector housing 16.

The exterior of connector housing 16 is contoured and has an exterior surface defined by a first section 28, a reduced diameter second section 30 which is separated from section 28 by a base 32. A further reduced diameter third section 34 which is separated from section 30 by a base 36. A still further reduced section 38 which is separated by a base 41. Section 38 is adapted to be inserted into a hose member.

Broadly, the redundant quick connector 10 of the present invention is generally L-shaped and has a retaining head 40, a body member 42 and a base member 44. The retaining head 40 is adapted to be inserted into the connector housing 16 and locked against the upset 14 of the tube 12 if the tube is attempted to be pulled out of housing 16. The body member 42 joins the retaining head 40 and the base member 44 and is adapted to adjoin the connector housing 16 and to provide retention support to the clip 10. The base member 44 clips to the connector housing 16 and in the preferred embodiment provides a camming surface for facilitating the locking of the clip 10.

The retaining head 40 is adapted to engage the upset 14 of tube 12. The retaining head 40 is generally hook shaped and is defined by a pair of spaced fingers 46. As disclosed, the spaced fingers have a generally flat end portion 50 for engaging the upset 14.

The fingers 46 are generally flat and parallel to one another. The length of fingers 46 is sufficiently long to insure that the flat end portion 50 is at least at the line of engagement 51. Line of engagement 51 is the imaginary line defined by the ends 53 of locking fingers 18.

The body portion 42 is defined by a channel having a base 54 and sidewalls 56. The sidewalls 56 extend generally perpendicular to base 54 and end in an edge 58. In the disclosed embodiment, the edge 58 is contoured to have the same general shape as and to generally mate with the exterior contour of connector housing 16. The channel shape of body portion 42 adds strength to the clip and provides tube pull-off retention in excess of 100 LBS force.

As can be seen, the retaining head 40 extends outwardly from the body portion 42 at an angle with respect to the body portion 42. The retaining head 40 is spaced from the body portion 42 by a distance which is slightly greater than the width of the overturned edge 60 of the connector housing 16. This space allows the retaining head 40 to be inserted into the connector housing 16.

The base portion 44 includes spaced leg members 62 which extend outwardly from body portion 42. Leg members 62 are preferably elongated relatively thin members having sides 68 and top and bottom edges 70. The sides 68 are spaced apart a distance which is slightly less than the outer diameter of the third section 34 of connector housing 16. Because the distance is less, legs 64 are biased against third section 34, but are free to slide with respect to section 34. Each of the sides 66 have outwardly bowed sections or detents 72 for receipt of the third section 34 as leg members 64 are slid along the third section 34. Detent 72 corresponds to the locked position, see FIG. 3, of clip 10.

The top edge 70 of each leg member 62 defines a cam surface shown generally at 74. The cam surface 74 functions to pull the retaining head 40 into the connector housing 16 and facilitates movement of the connector 10 to its clipped position. Cam surface 74 engages the base 36 of the second section 30. In the embodiment illustrated in FIG. 1, the third section 34 has a guide or retaining surface 76 to keep the leg members 62 adjacent to the base 36. It should be understood that some connectors do not have feature 76. It is not necessary to the proper functioning of the clip 10.

Referring now to FIGS. 2 and 3, the camming action of edge 74 is illustrated. With pressure applied to base 54 of body member 42 just behind the base member 44, the legs are caused to slide along the third section 34 and the cam surface 74 is caused to cam against the base 36. It should be appreciated that the ears 48 are biased against the tube 12.

To attach the clip 10 to the connector 16, the spaced fingers 46 are inserted into the female connector 16. See FIG. 2. Pressure is then applied to the body member 42 forcing the leg members 62 apart and sliding them over the third section 34. The clip 10 is fully clipped onto the connector 16 when the section 34 is received within detents 72. To facilitate the snapping of clip 10 onto connector 16, the free ends 64 of legs 62 are turned outwardly so that it is easy to begin the spreading of legs 62.

The legs 62 are preferably sufficiently resilient so that the clip 10 is easily snapped in place. In the preferred embodiment, the legs 62 are sufficiently resilient so that if the cam surface 74 does not engage against base 36, the legs can still be spread and snapped in place.

With reference to FIG. 3, the clip 10 is in the locked position. In this position, the detent 72 is engaging the third section 34 and the retaining head 40 is inserted into the connector housing to retain the tube 12 therein. The top edge 70 of legs 62 is abutting the base 36. In this way, the retention force of the clip or the pull-out strength is determined by the shear strength of the body member 42 at the intersection of the head 40 and base member 44. As should be appreciated, the tip 50 of ears 48 is generally aligned with the line of contact of the detent 72 and the base member 36 to reduce the bending moment in the body member 42. Additionally, the edge 58 is illustrated as closely conforming to the outer contour of the connector housing 16.

To disconnect the tube 12 from the connector housing 16, the base member is slid away from the connector housing 16 to the position illustrated in FIG. 2. The edge 70 cams against base 36 until legs 62 are free of the connector 16 and the retaining head 40 can then be slid out of the connector housing 16.

As should be appreciated, the clip 10 can be locked and unlocked without the need for tools. What has been disclosed, is a quick connector which provides a redundant clip having superior pull-off strength which is easy to manufacture and easy to use and that does not require the use of tools. Additionally, the clip provides visual indication of a properly locked assembly and precludes outflow of fluid if there is improper connection of the primary connector, and which overcomes the disadvantages of the prior art. The form of the invention illustrated and described herein is a preferred embodiment of these teachings. It is shown as an illustration of the inventive concepts, however, rather than by way of limitation, and it is pointed out that various modifications and alterations may be made within the scope of the appended claims.

With reference to FIG. 4, another embodiment of the redundant clip of the present invention is shown generally at 10. In the preferred embodiment, the clip is made from 301 stainless steel, ¾ hard with a thickness of 0.032 to 0.036 inches. The clip is used to retain a tube 12 within a connector housing 16. As should be appreciated, the tube 16 and the connector housing 12 are standard quick connects. The tube 12 includes an upset 14 and in the disclosed embodiment the connector housing 16 includes locking fingers 18 mounted in the interior 20 of the housing. The fingers 18 are adapted to retain the tube 12 within the female housing 16. The connector housing includes a top hat 22 and a bearing surface 24 for maintaining the alignment of the tube 12 within connector housing 16. O-rings 26 are provided to seal the male tube 12 with respect to the connector housing 16.

The exterior of connector housing 16 is contoured and has an exterior surface defined by a first section 28, a reduced diameter second section 30 which is separated from section 28 by a base 32. A further reduced diameter third section 34 which is separated from section 30 by a base 36. A still further reduced section 38 which is separated by a base 41. Section 38 is adapted to be inserted into a hose member.

With reference to FIG. 4, the unlocked or shipping position of connector 10 is illustrated. FIG. 7 illustrates the locked position of connector 10. FIGS. 5 and 6 illustrate the primary positions of the connector 10 as it is moved from the unlocked to the locked positions.

Broadly, the redundant quick connector 10 of the present invention is generally L-shaped and has a retaining head 40, a body member 42 and a base member 44. The retaining head 40 is adapted to be inserted into the connector housing 16 and locked against the upset 14 of the tube 12. The body member 42 joins the retaining head 40 and the base member 44 and is adapted to adjoin the connector housing 16 and to provide retention support to the clip 10. The base member 44 interconnects the clip to the connector housing 16 and provides a camming surface for facilitating the locking of the clip 10. In the preferred embodiment, the clip 10 is mounted upon the connector housing 16 and is not intended to be removed from the connector housing 16.

The retaining head 40 is adapted to engage the upset 14 of tube 12. The retaining head 40 is generally hook shaped and is defined by a pair of spaced fingers 46 which end in engaging ears 48. As disclosed, the spaced fingers have a rounded end portion 50 for engaging the upset 14. The engaging ears 48 extend inwardly to form a reduced space between the finger 46 and then are bent outwardly to form a surface 52 to allow a user to force the ears 48 from about the tube 12 when the clip 10 is to be locked. The reduced space between the fingers 46 has a width which is less that the diameter of the tube 12. In this way, the ears 46 can be biased outwardly to receive the tube 12. This is illustrated in FIG. 5.

The body portion 42 is defined by a channel having a base 54 and sidewalls 56. The sidewalls 56 extend generally perpendicular to base 54 and end in an edge 58. In the disclosed embodiment, the edge 58 is contoured to have the same general shape as and to generally mate with the exterior contour of connector housing 16. The channel shape of body portion 42 adds strength to the clip and provides tube pull-off retention in excess of 100 LBS force.

As can be seen, the retaining head 40 extends outwardly from the body portion 42 at an angle with respect to the body portion 42. The retaining head 40 is spaced from the body portion 42 by a distance which is slightly greater than the width of the overturned edge 60 of the connector housing 16. This space allows the retaining head 40 to be inserted into the connector housing 16.

Figure 9:
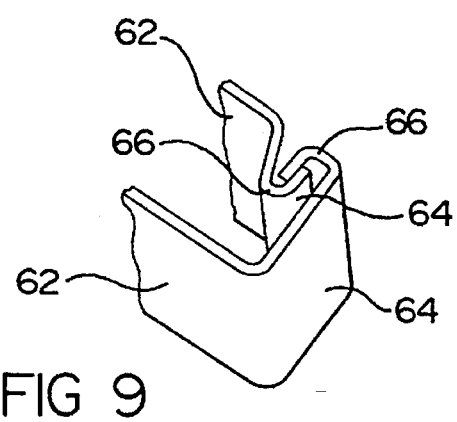
FIG. 9 is a partial view of the ends of the base member of the FIG. 4 embodiment.

The base portion 44 includes spaced leg members 62 which extend outwardly from body portion 42 and are joined at their ends 64. As shown in FIG. 9, the ends 64 are bent over to form mating lips 66 that can be easily snapped together and easily released. Legs 62 are normally biased outwardly.

Leg members 64 are preferably elongated relatively thin members having sides 68 and top and bottom edges 70. The sides 68 are spaced apart a distance which is slightly less than the outer diameter of the third section 34 of connector housing 16. Because the distance is less, legs 64 are biased against third section 34, but are free to slide with respect to section 34. Each of the sides 66 have outwardly bowed sections or detents 72 for receipt of the third section 34 as leg members 64 are slid along the third section 34. Detent 72 corresponds to the unlocked position, see FIG. 1, and detent 74 corresponds to the locked position, see FIG. 4, of clip 10.

The top edge 70 of each leg member 62 defines a cam surface shown generally at 74. The cam surface 74 interconnects the detents 72 and 73, and functions to pull the retaining head 40 into the connector housing 16 to engage the upset 14. Cam surface 74 engages the base 36 of the second section 30. In the embodiment illustrated in FIG. 4, the third section 34 has a guide or retaining surface 76 to keep the leg members 62 adjacent to the base 36. It should be understood that some connectors do not have feature 76. It is not necessary to the proper functioning of the clip 10.

In use, the clip 10 is initially in the position illustrated in FIGS. 4 and 5. It is intended that the clip 10 always remain attached to the connector housing 16 and in particular to third section 34. In the disclosed embodiment, clip 10 is mounted onto the third section 34 by separating the legs 62 and placing the third section 34 between them and then snapping the ends 64 together. As stated above, the legs 62 bias against section 34.

With reference to FIG. 6, the first step in locking the tube 12 with respect to the connector housing 16 is to rotate the clip 10 against the tube 12. With slight pressure against base 54 of body member 42, just behind head 40, the engaging ears 48 can be forced apart and about tube 12. The rotation of clip 10 is facilitated by the interaction of detent 72 with respect to the third section 34 which forms a pivot point. As can be seen, the edge 74 of preferably abutting the base 36 of second section 30.

Referring now to FIG. 7, the camming action of edge 74 is illustrated. With pressure applied to base 54 of body member 42 just behind the base member 44, the legs are caused to slide along the third section 34 and the cam surface 74 is caused to cam against the base 36. It should be appreciated that the ears 48 are biased against the tube 12 and form a pivot point with respect to member 12. As pressure is applied, the ears 48 pivot and will slide with respect to the tube 12 in the direction of connector housing 16 as the cam surface 74 is cammed against base 36.

With reference to FIG. 8, the clip 10 is in the locked position. In this position, the detent 73 is engaging the third section 34 and the retaining head 40 is inserted into the connector housing to retain the tube 12 therein. The top edge 70 of legs 62 is abutting the base 36. In this way, the retention force of the clip or the pull-out strength is determined by the shear strength of the body member 42 at the intersection of the head 40 and base member 44. As should be appreciated, the tip 50 of ears 48 is generally aligned with the line of contact of the detent 72 and the base member 36 to reduce the bending moment in the body member 42. Additionally, the edge 58 is illustrated as closely conforming to the outer contour of the connector housing 16.

To disconnect the tube 12 from the connector housing 16, the base member is slid away from the connector housing 16 to the position illustrated in FIG. 6. As above, the edge 70 and cam 74 abut the base 36 and the retaining head 40 is slid out of the connector housing 16 and pivots about the tube 12. In the position illustrated in FIG. 6, a user can push against the surface 52 of engaging ears 48 to spread the fingers to release the retaining head 40 from the tube 12. The clip 10 pivots about detent 72 to the position illustrated in FIGS. 1 and 2.

FIG. 10 illustrates the presently most preferred embodiment of the locking clip 110. Locking clip 110 includes retaining head 112, body portion 114 and base portion 116. Retaining head 112 is comprised of arms 118 that are received about a male member and into a female connector housing such that abutting ends 120 on arms 118 are positioned to engage a portion of a male member to thereby maintain it in a preselected position within the female housing.

Body portion 114 includes sidewalls 122 and 124. An intermediate wall 126 connects sidewalls 122 and 124. Intermediate wall 126 provides a force application surface that is utilized in order to manipulate clip 110 relative to a connector housing as will be described in more detail below. Extension 128 is provided on body portion 114 beyond base portion 116 in order to more greatly facilitate placing clip 110 into a locked position as will be described below.

Base portion 116 includes spaced leg members 130 and 132. Legs 130 and 132 are similar to legs 62 of the previously described embodiments but also include further improvements.

As can best be seen in FIGS. 11 and 12, an engaging means 134 is provided for interlocking the ends of legs 130 and 132 that are most distal from body portion 114. Engaging means 134 includes a generally T-shaped configuration 136 at the end of leg 130 and a pair of hooked finger members 138 at the end of leg 132. Of course, it will be appreciated that the T-shaped configuration 136 and the cooperating hooked fingers can be interchanged between legs 130 and 132. In the illustrated embodiment, hooked finger members 138 nestingly receive the crossbar 140 of T-shaped configuration 136. The curvature 142 on leg 130, which is a generally resilient member, biases crossbar 140 into the grasp of hooked fingers 138. Legs 130 and 132 are preferably a resilient, metal material such that they are manipulable relative to each other in order to engage or disengage fingers 138 and tee 136 as desired.

Figure 13:
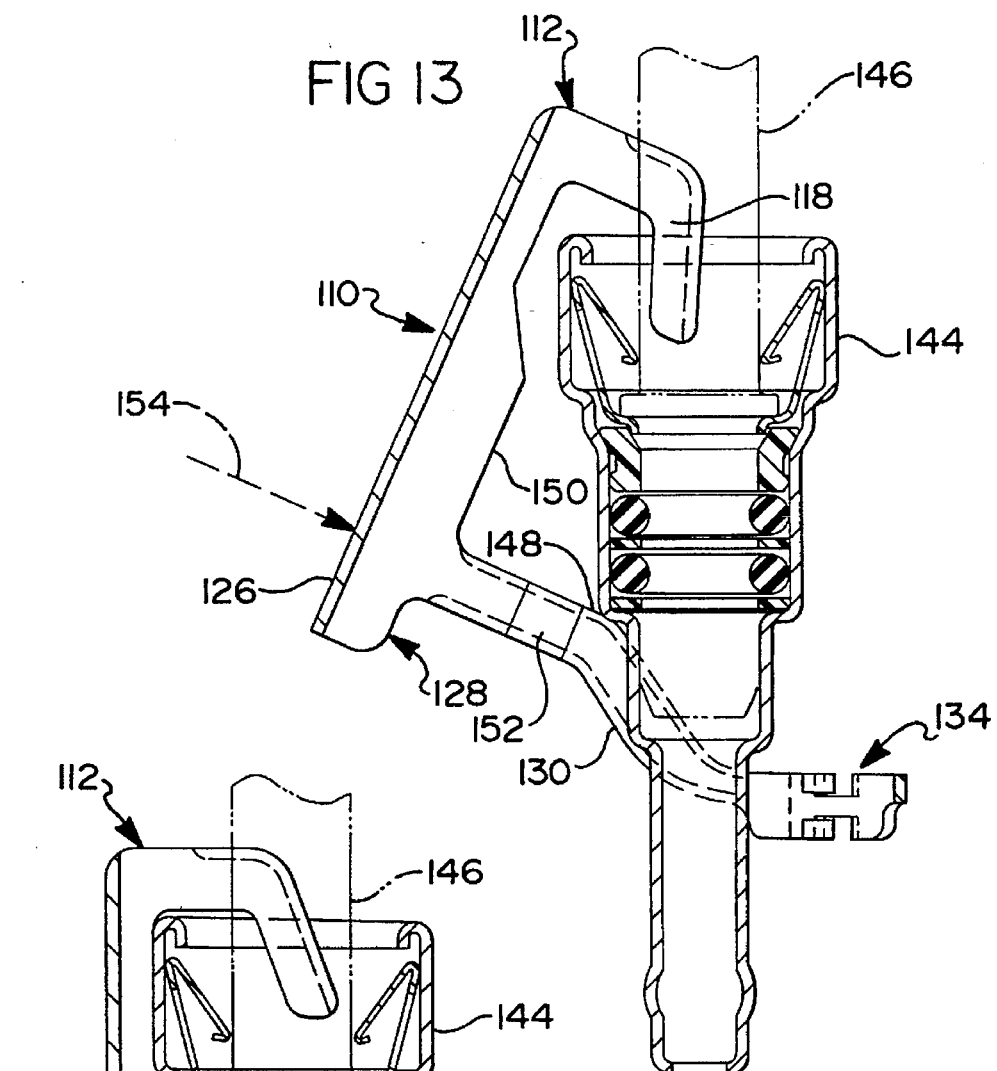
FIGS. 13 and 14 are partial-cross-sectional illustrations of the embodiment of FIG. 10 in an unlocked and a locked position, respectively.
Figure 14:
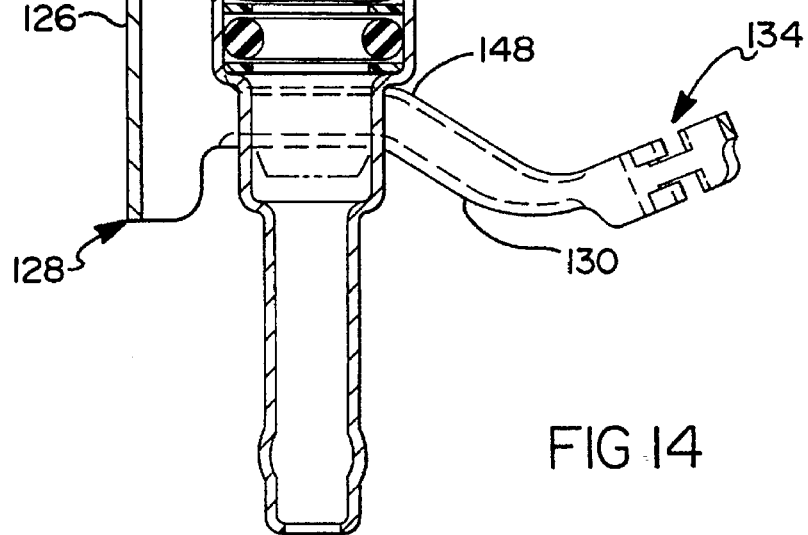

Referring now to FIGS. 13 and 14, clip 110 is shown as it would be applied to an assembly of a female connector housing 144 and a male member 146. Female connector housing 144 is the same as housing 16, described above. Similarly, male member 146 is essentially the same as male member 12, described above. Since there are a number of similarities between the embodiment of FIGS. 10–14 and the previously described embodiments, only the differences will be detailed in the following discussion.

In order to place clip 110 about female housing connector 144, engaging means 134 must be initially disengaged. For example, if clip 110 were in the position illustrated in FIGS. 10 and 11, legs 130 and 132 would be manipulated relative to each other such that crossbar 140 is removed from the grasp of hooked finger members 148. As can be appreciated in FIG. 11, for example, disengagement of crossbar 140 from the grasp of fingers 148 will result in a generally outward and arcuate movement of the curved portion 142 on leg 130 relative to leg 132. The resiliency inherent in legs 130 and 132 biases each of them outward or away from each other. With the ends of legs 130 and 132 separated, the legs can be placed generally about female housing connector 144. Then engaging means 134 preferably is utilized to couple the ends of legs 130 and 132 such that clip 110 is maintained about housing 144.

Next, retaining head 112 is positioned as generally illustrated in FIG. 13 with arms 118 being received about male member 146. Arms 118 are preferably spaced apart a distance essentially equal to an outer diameter on male member 146 such that the inside surface of arms 118 slightly bias against the outer surface of male member 146.

With clip 110 in the position generally illustrated in FIG. 13, cam surface 148 is positioned to cam along a portion of female housing connector 144. Clip 110 is manipulated in a generally rightward (according to the drawing) direction until the inner contour 150 of clip 110 is matingly received against the outer contour of female housing 144, as illustrated in FIG. 14. Detents 152 are provided on legs 130 and 132 in order to facilitate maintaining clip 110 in the locked position illustrated in FIG. 14.

Extension 128, which is provided on body portion 114 of clip 110, facilitates moving clip 110 into a locked position. The placement of extension 128 allows a user to have a point of force application centered over a line generally defined along or through legs 130 and 132, which facilitates easier camming of clip 110 relative to female housing 144. The presence of extension 128 allows a force applied along the force line illustrated at 154 in FIG. 13. This provides an advantage over the embodiments illustrated and discussed above because the application of force for canning the clip relative to the housing is more readily positioned in an optimum location on force application surface or wall 126.

Apart from the differences noted above and as shown in the illustrations, the presently most preferred embodiment of this invention is similar in nature and function to those described above. Various combinations of the features of the illustrated embodiments are possible as the needs of a particular application may require.

As should be appreciated, clip 10 or 110 can be locked and unlocked without the need for tools. A quick connector designed according to this invention provides a redundant clip having superior pull-off strength that is easy to manufacture, easy to use, and does not require the use of tools. Additionally, the clip provides visual indication of a properly locked assembly and precludes outflow of fluid if there is improper connection of the primary connector while overcoming the disadvantages of the prior art. The form of the invention illustrated and described herein is a preferred embodiment of these teachings. It is shown as an illustration of the inventive concepts, rather than by way of limitation, as various modifications and alterations may be made within the scope of the appended claims.

What is claimed is:

1. A locking clip for use in retaining a male member within a female connector, comprising:

a retaining head for engaging a portion of said male member when said male member is positioned within said female connector; and a base portion distal from said retaining head and having spaced members that are received about an outer diameter of said female connector, said spaced members having a cam surface that cams against said female connector to facilitate placing said clip into a locking position for retaining said male member within said female connector; and a body portion extending between said retaining head and said base portion wherein said spaced members each have a first end adjacent said body portion and a second end distal from said first end and said second end of each spaced member includes engaging means for interlocking said second ends with each other such that said spaced members are maintained around a portion of said female connector when said second ends are interlocked.

2. The locking clip of claim 1, wherein said spaced members have inner surfaces that are spaced such that said inner surfaces bear against said female connector.

3. The locking clip of claim 1, wherein said spaced members are generally flexible such that portions of said members proximate and including said second ends are manipulable relative to each other for selectively interlocking said engaging means.

4. The locking clip of claim 1, wherein said second end of one of said spaced members has a generally T-shaped configuration and wherein said second end of the other of said spaced members has a finger member adapted to engage a portion of said generally T-shaped end to interlock said second ends.

5. The locking clip of claim 1, wherein each said spaced member has a top surface, a bottom surface and inner and outer surfaces and wherein said cam surface is disposed on said top surface of at least one of said spaced members.

6. The locking clip of claim 1, wherein said body portion joins said spaced members at at least one point and said body portion has an extension that extends beyond said at least one point in a direction generally away from said retaining head.

7. The locking clip of claim 6, wherein said extension provides an extended force application surface, which facilitates manipulating said clip relative to said female connector into said locking position.

8. The clip of claim 1, wherein said third portion comprises two spaced legs that generally surround the female housing and each said leg has a top surface, a bottom surface, an inner surface and an outer surface and wherein said inner surface on said legs operatively engages said female housing to facilitate maintaining said clip in said locked position.

9. The clip of claim 8, wherein said cam surface is defined on said top surface of at least one of said legs.

10. The clip of claim 8, wherein said cam surface is defined on said inner surface of said legs.

11. A locking clip for use in retaining a male member within a female housing member, comprising:

a first portion for engaging said male member when said male member is received in said female housing;

a body portion extending from said first portion and adapted to be conformingly placed against said housing when said clip is in a locked position; and a third portion spaced from said first portion and extending generally perpendicularly away from said body portion, said third portion being received about said female housing in an unlocked and a locked position, said third portion having a cam surface for engaging an exterior portion of said housing to facilitate placing said clip in said locked position and wherein said body portion has an extension that extends beyond said third portion in a direction generally away from said first portion.

12. The clip of claim 11, wherein said extension provides a force application surface that facilitates manipulating said clip relative to said housing such that said cam surface cams against the exterior portion of said housing and said clip is moved into said locked position.

13. The clip of claim 11, wherein said extension facilitates pivoting said clip relative to said housing to thereby move said clip into said locked position.

14. The clip of claim 11, wherein said third portion comprises two spaced legs that each have a first end adjoining said body portion and a second end distal from said first end and wherein said second ends include cooperating members for coupling said second ends together.

15. The clip of claim 14, wherein said cooperating members comprise a generally T-shaped configuration on the second end of one of said legs and a finger adapted to engage a portion of said T-shaped configuration, on the second end of the other of said legs.

16. The clip of claim 15, further comprising a pair of said fingers on the second end of the other of said legs.

* * * * *